United States Patent [19]

Macken et al.

[11] 4,139,409
[45] Feb. 13, 1979

[54] LASER ENGRAVED METAL RELIEF PROCESS

[76] Inventors: John A. Macken, 4039 Shadow Hill Dr.; Paul N. Palanos, 3852 Sherbrook Dr., both of Santa Rosa, Calif. 95404

[21] Appl. No.: 876,367

[22] Filed: Feb. 9, 1978

Related U.S. Application Data

[63] Continuation of Ser. No. 745,856, Nov. 29, 1976, abandoned.

[51] Int. Cl.$^2$ .............................................. C23F 1/02
[52] U.S. Cl. ...................... 156/634; 96/35; 96/36; 156/272; 156/643; 156/658; 156/661; 219/121 LM
[58] Field of Search ........ 156/272, 634, 643, 654–656, 156/658, 659, 661; 96/35, 36, 36.2–36.3, 38.1, 38.3; 346/76 L; 219/121 LM; 264/25

[56] References Cited

U.S. PATENT DOCUMENTS

| | | | |
|---|---|---|---|
| 3,455,239 | 7/1969 | Smith | 101/395 |
| 3,549,733 | 12/1970 | Caddell | 264/25 |
| 3,742,182 | 6/1973 | Saunders | 219/121 LM |
| 3,832,948 | 9/1974 | Barker | 101/401.1 |
| 3,867,217 | 2/1975 | Maggs et al. | 252/79.2 X |
| 3,884,570 | 5/1975 | Waly | 353/98 |

*Primary Examiner*—William A. Powell
*Attorney, Agent, or Firm*—Edward E. Roberts

[57] ABSTRACT

Means and method for forming a raised metallic relief wherein a metal foil affixed to a support film is selectively etched, affixed to a wood surface, and then exposed to a scanning concentrated laser beam to vaporize the support film and wood in areas unprotected by the metal sheet. The metal design is left on the wood surface in the form of a raised relief.

8 Claims, 5 Drawing Figures

LASER ENGRAVED METAL RELIEF PROCESS

This is a continuation, of application Ser. No. 745,856 filed Nov. 29, 1976, now abandoned.

BACKGROUND

1. Field of the Invention

The invention relates to the production of a metallic relief on wood and, more particularly, to means for producing a metallic relief on wood by a method suitable for mass production. A metal sheet is affixed to a support film, etched to the desired pattern, and affixed to a wooden substrate. The metal then selectively reflects a scanning laser beam which exposed portions of the supporting film and substrate are vaporized. The resultant product appears to be thick metal parts standing in relief above a wooden surface.

2. Prior Art

It is known that metallic relief plaques can be made by deep etching into solid metal. This is accomplished by using a photo-resist film to protect certain areas of the metal. Other areas of the metal are then etched away on the exposed surfaces by immersing the metal in the correct etching solution. The solution dissolves the unprotected metal and leaves raised areas on a recessed background. At this point, to obtain contrast, the background of the solid metal plaque is usually painted or purposely tarnished. This method is limited in its resolution because the metal etching process results in metal removal below the protective surface until it is undermined sufficiently to break off. Thus, either the relief depth or the relief thickness is restricted.

If another type of plaque is desired, such as raised metal letters on a wooden substrate, the plaque is formed by individually attaching cast meal letters to the wood.

The method of this invention produces raised metal patterns or symbols on a wooden background with excellent resolution, low cost, a desirable appearance previously unobtainable, and less metal removal.

SUMMARY OF THE INVENTION

A metallic sheet is adhered to an organic film material. The metallic sheet is selectively etched on exposed surfaces thereof using photo-resist methods well known to those skilled in the art. The film maintains the position of the metal areas which remain after etching. The film is then bonded to a wooden substrate blank with the metal areas facing upwards. A focused laser beam is then scanned over the area of the wood covered by the metal sections and film. The laser beam is reflected by the metal areas. The laser beam vaporizes the film which is unprotected by the metal and also removes a depth of wood. The depth of the vaporized cut into the wood depends upon the laser power and exposure time. The final product has the appearance of a metal relief attached to the surface of a wooden block, with resolution not attainable in deep metal etching.

DETAILED DESCRIPTION

Figure 1:
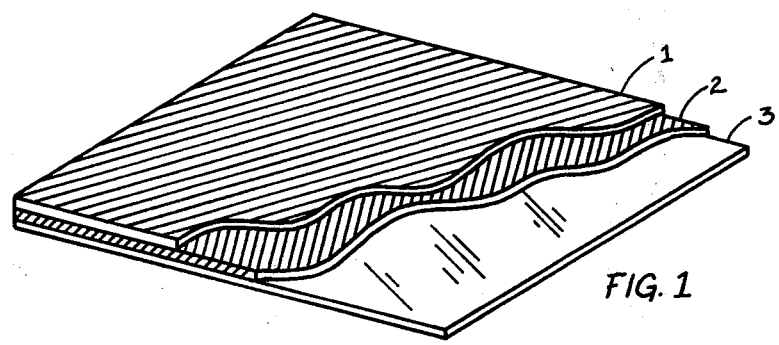
FIG. 1 is a cross-sectional view of a three-layer photo-resist composite prior to processing.

Referring to FIG. 1, there is shown a multilayer sheet which in a preferred embodiment is composed of three layers of different materials. Layer 1 is an organic substance which changes its physical properties when exposed to ultraviolet light. Such substances are commonly referred to as photo-resists and are known to those skilled in the art of manufacturing electronic components. There are many different formulations for photo-resists, but such differences do not significantly affect the operation of this invention. Layer 2 is a metallic substance such as copper, brass, aluminum, or the like. For purposes of illustration in this embodiment, it is presumed that layer 2 is a sheet of brass approximately 0.005 inches thick. Layer 3 is a flexible organic film or sheet approximately 0.002 inches thick. The film can be made of thermo-plastics such as urethane or polyvinyl chloride, which will bond to the metal with the application of heat and pressure. The layer 3 could also be a plastic such as polyester film or paper which requires an adhesive to bond to the metal. In this case, there would be a thin adhesive layer (not shown in drawings) between layer 2 and 3 in FIG. 1.

In accordance with the teachings of this invention, layer 1 of the sheet of FIG. 1 is sequentially exposed, developed, and etched according to the techniques well known to those skilled in making printed circuit boards. Exposure of layer 1 to ultra-violet light, or other appropriate radiation, changes the property of the film of layer 1 such that it is polymerized either in the area exposed to the light, or the area not exposed to the light, depending on whether positive-acting or negative-acting photo-resist is used. Developing of the photo-resist washes away portions of layer 1 from the metal of layer 2 in the desired areas whereby a patterned protective layer is formed on layer 2. The sheet is then passed through an etching bath or spray such that metal layer 2 is attacked by an acid or other etchant (such as ferric chloride) in the areas unprotected by the photo-resist. After the exposure of the photo-resist and the subsequent etching process, the three layer film appears as shown in FIG. 2, the plastic film layer 3 being unaffected by the above processing to thereby provide supporting areas for the metal and photo-resist layers.

Figure 2:
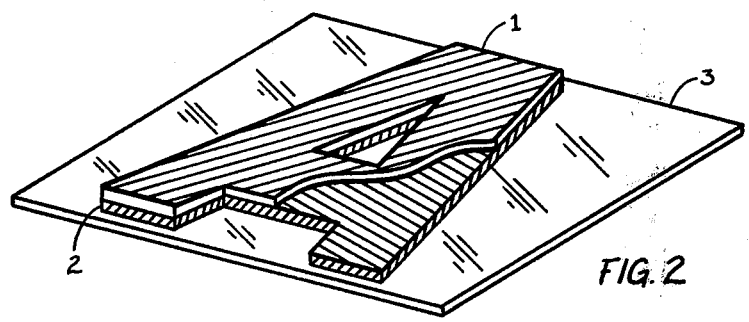
FIG. 2 is a cross-sectional view of the composite of FIG. 1 after the photo-resist has been developed and removed, and the metallic sheet has been etched away leaving the desired metallic pattern.

Referring now to FIG. 2, there is shown an exemplary perspective view of the composite sheet after it has been developed and etched as described supra. Although layer 3 is unaffected, the metal and photo-resist layers now form discrete areas which can be in the form of letters (as shown) or other art work.

Figure 3:
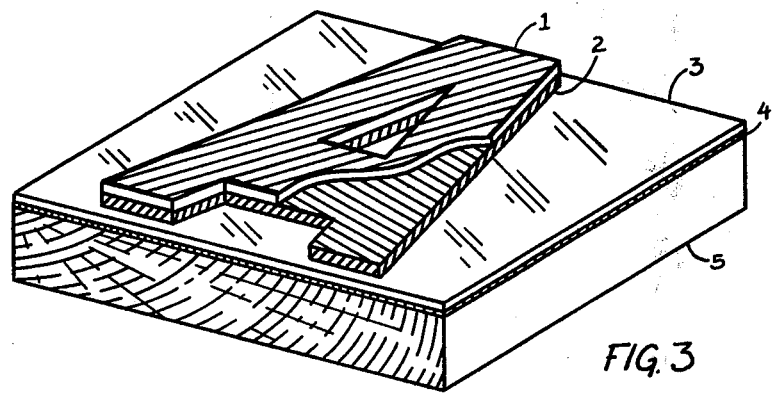
FIG. 3 is a view of the processed composite of FIG. 2 bonded to a substrate material.

Referring now to FIG. 3 there is shown the composite sheet, with layers 1, 2 and 3 bonded by means of a suitable adhesive layer 4 to material 5. No adhesive layer 4 would be required if layer 3 could be bonded directly to material 5 with the application of heat and pressure. Material 5 is a substrate material (such as wood or plastic, etc.) which is to be laser engraved. Once the processed material has been bonded to the substrate material 5, which for purposes of illustration is herein selected to be wood, the composite structure is passed under a scanning continuous laser such as a 100 watt carbon dioxide ($CO_2$) laser exhibiting overlapping scans that make a TV-like rasterscan across the surface of the composite structure. As the selectively focused laser beam is scanned across the materials shown in FIG. 3 the laser beam cleanly vaporizes portions of the organic material it strikes while being reflected from the metallic material. Thus, the portions of layers 1, 3, 4 and 5 exposed to the scanning laser will be vaporized while areas which lie beneath layer 2 will be protected.

Acceptable results are achieved by focusing the laser light to a power density of about 30,000 watts per square centimeter. In the case of a 100 watt carbon dioxide laser, this amounts to a focused spot size of about 0.5 millimeters diameter.

Figure 4:
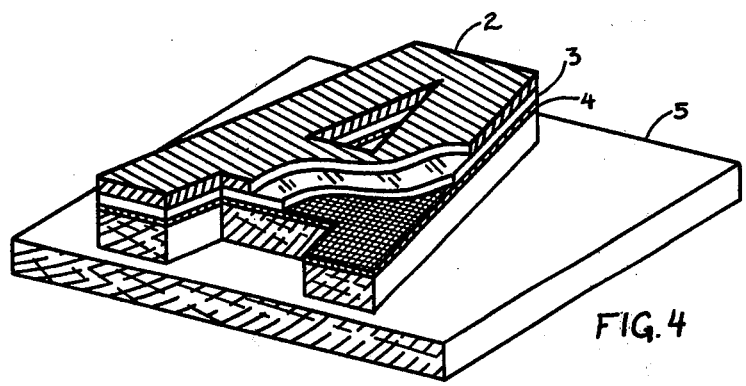
FIG. 4 is a view of the composite of FIG. 3 after laser engraving has been carried out, which leaves the desired metallic-appearing relief on the substrate material.

Referring now to FIG. 4 there is shown the result after the scanning laser beam has passed over the assembled materials. The scanning laser beam has vaporized the wooden layer 5 to a depth which is preselectively determined by the laser power and the length of time the laser was allowed to scan across the material. At this juncture, there is provided a bas-relief device which has a metallic surface formed by layer 2 and a support structure or substrate formed by the material of layer 5. The laser has also vaporized away all of photo-resist layer 1 if this layer is mounted up, or it will have vaporized all of layer 3 if this layer was mounted up. The laser will also have vaporized away layers of adhesive or film not protected by the metal mask so that the result appears to be a metal capped, raised area above a recessed background. The sides of the cut are perfectly matched to the shape of the metal film, so that the metal appears to be much thicker than it actually is. When this substrate material is a dark wood, such as walnut, the appearance is as if a thick piece of metal is protruding from the recessed surface. This metal may then be treated in any desirable manner, such as polishing or the like.

Figure 5:
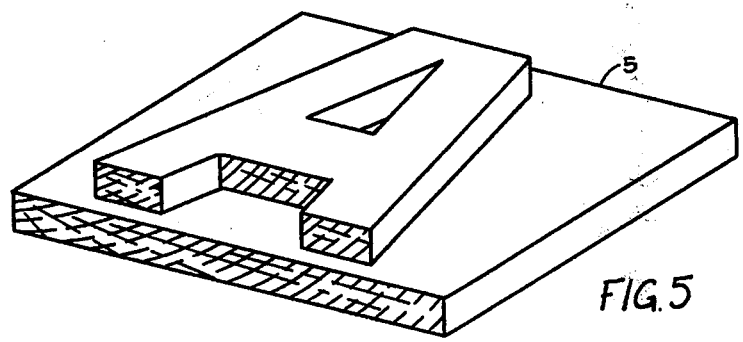
FIG. 5 is a view of the engraved substrate material after the metal pattern and adhesive are removed.

If layers 2, 3 and 4 are removed, as depicted in FIG. 5, the result is a device, such as a plaque, with free standing raised letters or other artwork of the same material as the substrate.

The removal of these layers can be accomplished by mechanical means such as peeling, scrapping or sanding. Also, they can be removed by methods which attack the adhesive layer 4, such as solvents or the application of heat or cold.

Thus, there is presented the novel concept of a mask used for laser engraving where free-standing metallic areas (layer 2) are supported by a film (layer 3) which can be bonded (adhesive 4) to the substrate material (layer 5) to be laser engraved. The film is made of a material which can be vaporized by the laser beam such that no traces of the film are left after the laser beam has scanned across the layer 5 substrate. Only the metallic areas protect the substrate from the scanning laser beam. After the substrate has been vaporized to the desired depth in the unprotected areas the remaining portions of the mask consisting of the metal film, the plastic film and the adhesive, can be removed and discarded by releasing the adhesive or mechanically abrading away these layers.

Of course, it will be recognized that layers 2, 3 and 4 can be retained as shown in FIG. 4 which results in raised metallic coated letters or other art work, whereas the removal of said layers will result in raised wooden (or other substrate material) letters or other art work.

A variation of the process would be to flip layers 1, 2 and 3 upside down and bond them to the wood adhesive layer contacting photo-resist layer 1. Alternatively, photo-resist layer 1 may be removed in a stripping process well known to those skilled in the art, and layers 2 and 3 can be bonded to substrate 5. If this variation is used, the art work may have to be reversed so that it reads properly when flipped again.

There has been shown a preferred embodiment of means and method for laser engraving of a workpiece wherein a dual-purpose mask was formed by photo-resist techniques. It will be apparent to those skilled in the art that various modifications and improvements may be made without departing from the purview of the invention, which is to be determined only by the appended claims.

What is claimed is:

1. A method of forming relieved structures comprising:
    forming a mask of material for reflecting a laser beam, said mask comprising a metallic layer sandwiched between first and second organic layers;
    establishing a pattern in said first organic layer to protect said metallic layer;
    removing portions of said metallic layer not protected by said pattern;
    bonding said mask to a substrate to form a masked array;
    scanning said masked array with a laser beam which vaporizes portions of said first and second organic layers not protected by said metallic layer, said laser beam being controlled such that said substrate is vaporized to a desired depth in order to maintain a relieved structure in said substrate as defined by said mask.

2. The method recited in claim 1 wherein:
    said first organic layer is a photo-resist material and said establishing step includes exposing and developing said photo-resist material to provide said pattern; and
    said removing step includes etching said metallic layer to dissolve portions thereof not protected by said pattern.

3. The method recited in claim 2 including the step of;
    removing said mask from said substrate after the scanning step to provide a relieved structure formed exclusively from said substrate.

4. The method recited in claim 2 wherein;
    said bonding step includes providing an adhesive layer between said second organic layer and said substrate, said scanning step vaporizing portions of said adhesive not protected by said metallic layer.

5. The method recited in claim 2 wherein;
    said bonding step includes providing an adhesive layer between said first organic layer and said substrate, said scanning step vaporizing portions of said adhesive not protected by said metallic layer.

6. The method recited in claim 4 including the step of removing said first organic layer prior to the bonding step.

7. A method of forming relieved structures comprising:
    forming a mask of material for reflecting a laser beam, said mask comprising an organic photo-resist first layer over a metallic second layer, said metallic second layer being bonded to an organic third layer;
    exposing and developing said photo-resist layer to provide a preselected protective pattern on said metallic layer;
    etching said metallic layer to dissolve portions thereof not protected by said protective pattern;

bonding said third layer of said mask to a substrate to form a masked array;

scanning said masked array with a laser beam which vaporizes exposed portions of said protective pattern and said organic third layer, and is reflected by said metallic layer, said laser beam being controlled such that said substrate is vaporized only to a desired depth in order to maintain a relieved structure in said substrate as defined by said mask.

8. The method recited in claim 7 wherein:
said bonding step is achieved by providing an adhesive layer between said third layer and said substrate, said scanning step vaporizing portions of said adhesive not protected by said metallic layer.

* * * * *